UNITED STATES PATENT OFFICE.

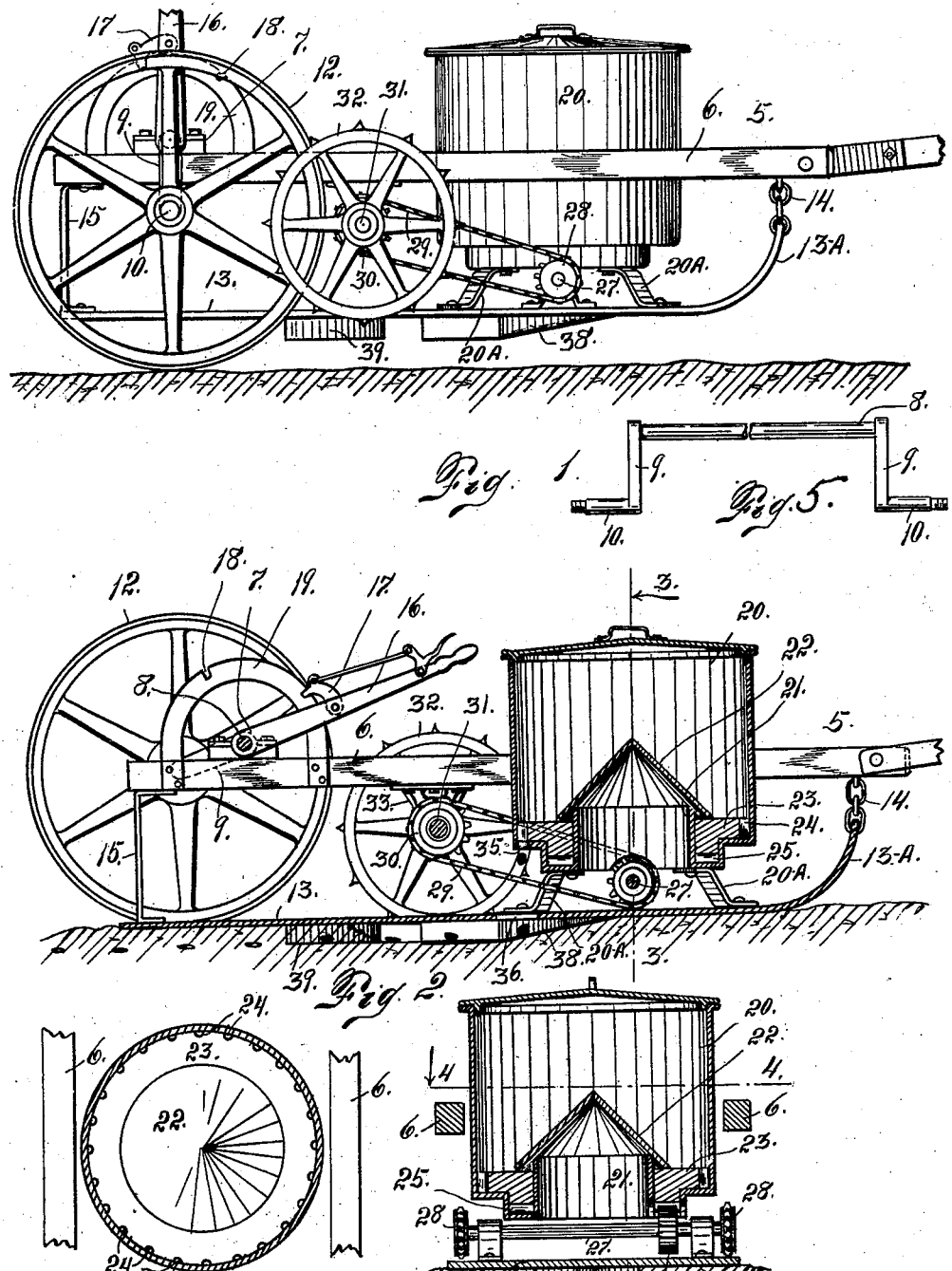

FRANK C. BROWN, OF CANON CITY, COLORADO, ASSIGNOR OF ONE-HALF TO JOHN W. MARSH, OF CANON CITY, COLORADO.

PLANTING OR SEEDING MACHINE.

No. 859,869.  Specification of Letters Patent.  Patented July 9, 1907.

Application filed December 17, 1906. Serial No. 348,107.

*To all whom it may concern:*

Be it known that I, FRANK C. BROWN, a citizen of the United States, residing at Canon City, in the county of Fremont and State of Colorado, have invented certain new and useful Improvements in Planting or Seeding Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in seeding or planting machines, being more especially intended for planting beet seeds or seeds of other vegetables or plants which are planted in rows.

The object of my machine is to avoid as far as possible this difficulty, and thereby not only economize so far as seed is concerned, but also do away with the work required to thin the plants. By means of my improved construction it becomes practicable to drop the seeds at suitable intervals and it is believed practicable to drop a single seed at a time. Beet seeds are of considerable size.

My improved machine includes a wheel or disk located in the bottom of the seed box, and provided with pockets each of which may be of such size as to receive a single seed but not large enough to receive more than one seed. These pockets may be located at such intervals, that the seeds may be dropped at any desired distance apart. Provision is also made for opening the ground to receive the seeds, and for closing the earth over the seeds.

The invention will now be described in detail reference being made to the accompanying drawing in which is illustrated an embodiment thereof.

In this drawing, Figure 1 is a side elevation of my improved machine, the frame and sled portion being in the raised or in-operative position. Fig. 2 is a longitudinal sectional view of the same showing the sled and frame lowered to the operating position. Fig. 3 is a transverse section taken on the line 3—3 Fig. 2. Fig. 4 is a horizontal section taken through the seed box above the seed-distributing wheel, the central or cone-shaped portion of the seed box being shown in plan view. This section is taken on the line 4—4 Fig. 3. Fig. 5, is a detail view of the crank shaft upon which the ground wheels are journaled.

The same reference characters indicate the same parts in all the views.

Let the numeral 5 designate a suitable frame composed of horizontally disposed separated side bars 6 whose rear portions are provided with journal boxes 7 in which is journaled an axle 8 having crank arms 9 provided with short shafts or stub axles 10 upon which the ground wheels 12 are journaled. Connected with this frame is a sort of sled 13 having furrow openers and closures which may be composed of a metal plate turned upwardly in front as shown at 13A, its forward extremity being connected with the frame bars by links 14. The rear extremity of the sled is connected with the side bars 6 by brackets 15. Made fast to the axle 8, is an operating lever 16 provided with a pawl 17 adapted to engage notches 18 formed in a quadrant 19. By means of this lever, the frame may be raised or lowered. When the lever is in the position shown in Fig. 2 the frame and sled are in the lower or operating position. When it is desired to travel from place to place or in other words when the machine is not in use for seeding purposes, it is only necessary to throw the lever 16 to the upright position or that shown in Fig. 1, in order to lift the frame and sled to the position shown in the last named figure.

Mounted on the sled between the bars 6 of the frame, is a seed box 20 which is supported by legs 20A. In the center of the seed box is located a cylindrical casing 21 provided with a cone-shaped top 22 whereby the seeds are thrown outwardly. In the bottom of the seed box and surrounding the casing 21, is a seed-distributing wheel 23 having pockets 24 formed in its periphery and of such size as to receive seeds. The lower face of this wheel is cogged as shown at 25 for engagement with a gear 26 fast on a shaft 27 carrying sprocket wheels 28 which are connected by chains 29 with sprockets 30 fast on a shaft 31 provided with traction wheels 32 at its outer extremities, the traction wheels also being fast thereon. The shaft 31 is journaled in boxes 33 secured to the under surface of the frame bars. The ground wheels and also the traction wheels are arranged to engage the ground on opposite sides of the sled. The seed box is provided with an opening 35 directly in line with an opening 36 formed in the sled. Every time a pocket 24 of the distributing wheel, registers with the openings 35 and 36, a seed drops from the pocket through these openings, into a channel or recess formed in the ground by means of a shoe 38 pointed at its forward extremity. In the rear of the shoe 38, is located a pair of wings 39 arranged to close up the channel and cover the seeds as the machine is carried along.

From the foregoing description the use and operation of my improved seeding machine will be readily understood. Assuming that the seed box contains a quantity of seeds, and that the machine is in the position illustrated in Fig 2, as the machine is drawn across the field, the traction wheels 32 are rotated and transmit motion to the shaft 27 by virtue of the sprocket chains 29 and the sprocket wheels 28 and 30. Rotary motion is imparted to the distributing wheel or disk 23, by the gear 26 which enters an opening formed in the bottom of the seed box below the gear and meshes with the cogs 25 of the distributing wheel. As this wheel is rotated within the seed box, the pockets 24 receive the seeds and carry them around to the opening 35, when these seeds are dropped through the said opening into a channel 46 and subsequently covered as heretofore explained.

Having thus described my invention, what I claim is:

1. A seeding machine provided with ground wheels, a frame supported thereon, a sled carried by the frame, a seed box mounted on the sled, a shaft journaled on the frame, traction wheels fast on the shaft, a distributing wheel located in the seed box and having a series of pockets in its periphery close to the inner surface of the box, the latter having an opening in its bottom to receive the seeds from the pockets as the latter are carried into register with the said opening, the sled also having an opening to allow the seeds to drop through, suitable means secured to the under surface of the sled for forming a channel in the earth to receive the seeds, and suitable means located in the rear of the channelling means for closing the channel and covering the seeds, substantially as described.

2. The combination of a frame, ground wheels upon which the frame is supported, the frame being vertically adjustable on the said wheels, a seed distributing wheel, pockets arranged in a circle and an even distance apart in the seed-distributing wheel, traction wheels for actuating the said distributing wheels, the traction wheels being mounted on the frame and adjustable therewith whereby they may be thrown into or out of operative position, substantially as described.

3. The combination of a frame, ground wheels upon which the frame is mounted, seed-distributing mechanism comprising a seed box having arranged therein a cylindrical casing provided with a cone shaped cover for throwing the seeds outwardly, and a distributing wheel provided with pockets in its periphery which are adapted to register with an opening in the bottom of said seed box, and traction wheels mounted on the frame and connected in operative relation with the seed-distributing mechanism, the said wheels being vertically adjustable whereby they may be made to engage or disengage the ground or be thrown into operative or inoperative position as may be desired.

In testimony whereof I affix my signature in presence of two witnesses.

FRANK C. BROWN.

Witnesses:
  A. J. O'BRIEN,
  DENA NELSON.